United States Patent
Banerjee et al.

(10) Patent No.: US 11,336,639 B1
(45) Date of Patent: May 17, 2022

(54) SYSTEMS AND METHODS FOR MANAGING A NEED-TO-KNOW DOMAIN NAME SYSTEM

(71) Applicant: CA, INC., San Jose, CA (US)

(72) Inventors: Ashok Banerjee, Redwood City, CA (US); Leonid Belkind, Rishon Le Ziyon (IL); Russell Daigle, Sunnyvale, CA (US)

(73) Assignee: CA, Inc., New York, NY (US)

( * ) Notice: Subject to any disclaimer, the term of this patent is extended or adjusted under 35 U.S.C. 154(b) by 273 days.

(21) Appl. No.: 16/576,275

(22) Filed: Sep. 19, 2019

(51) Int. Cl.
G06F 13/00 (2006.01)
H04L 29/06 (2006.01)
H04L 67/10 (2022.01)
H04L 61/4511 (2022.01)
H04L 49/90 (2022.01)

(52) U.S. Cl.
CPC ...... H04L 63/0838 (2013.01); H04L 61/1511 (2013.01); H04L 63/105 (2013.01); H04L 67/10 (2013.01); H04L 49/9084 (2013.01)

(58) Field of Classification Search
CPC ............... H04L 63/0838; H04L 63/105; H04L 61/1511; H04L 67/10; H04L 49/9084
USPC .......... 709/245, 202, 201, 203; 726/2–5, 26
See application file for complete search history.

(56) References Cited

U.S. PATENT DOCUMENTS

| 7,571,489 B2 * | 8/2009 | Ong ........................ G06F 21/34 |
| | | 726/29 |
| 10,645,077 B2 * | 5/2020 | Paert ......................... H04L 9/14 |
| 10,666,642 B2 * | 5/2020 | Antonyraj ............ H04L 63/0853 |
| 2006/0083228 A1 * | 4/2006 | Ong .................... H04L 63/0869 |
| | | 370/389 |
| 2016/0330195 A1 * | 11/2016 | Paert ..................... H04L 9/3263 |
| 2017/0250974 A1 * | 8/2017 | Antonyraj ............. H04W 12/06 |

* cited by examiner

Primary Examiner — Kenneth R Coulter
(74) Attorney, Agent, or Firm — Foley & Lardner LLP

(57) ABSTRACT

The disclosed computer-implemented method for managing a need-to-know domain name system may include (i) intercepting, by an agent of the computing device, network traffic received on the computing device, (ii) generating, by the agent, a one-time password based on a unique identifier of the agent of the computing device, (iii) wrapping, by the agent, the network traffic with the one-time password, and (iv) pushing, by the agent, the wrapped network traffic to a cloud server using a local domain name system (DNS) of the agent of the computing device, wherein the local DNS comprises a private domain name unpublished in a global DNS. Various other methods, systems, and computer-readable media are also disclosed.

20 Claims, 6 Drawing Sheets

SYSTEMS AND METHODS FOR MANAGING A NEED-TO-KNOW DOMAIN NAME SYSTEM

BACKGROUND

The Domain Name System (DNS) is a hierarchical naming system for computing resources connected to the Internet. The DNS typically translates domain names that are more easily understood and memorized by people (e.g., www.mydomain.com) into numerical identifiers associated with computing resources in order to address and locate these resources worldwide. The DNS often provides public access to a variety of information about the various domains or resources it manages, such as information that identifies the owner of a particular domain or resource, information that identifies the type of resource involved, etc. Unfortunately, attackers may explore the public information provided by the DNS in an attempt to identify vulnerabilities and/or domains that they can exploit. For example, an attacker may, using public information gleaned from the DNS, attack or infiltrate a domain using a variety of different types attacks, such as buffer overflow attacks, SQL injections, and the like.

SUMMARY

As will be described in greater detail below, the present disclosure describes various systems and methods for managing a need-to-know domain name system designed to limit access to protected computing resources.

In one example, a method for managing a need-to-know domain name system may include (i) intercepting, by an agent of the computing device, network traffic received on the computing device, (ii) generating, by the agent, a one-time password based on a unique identifier of the agent of the computing device, (iii) wrapping, by the agent, the network traffic with the one-time password, and (iv) pushing, by the agent, the wrapped network traffic to a cloud server using a local domain name system (DNS) of the agent of the computing device, wherein the local DNS comprises a private domain name unpublished in a global DNS.

In some examples, the method may include performing a security action. The security action may include at least one of terminating access to the cloud server or modifying the local DNS of the agent of the computing device. The method may include obtaining, by the agent, security context data of the computing device, encrypting the security context data, transmitting the security context data with the wrapped network traffic, and performing the security action based on the security context data. The security context data may include at least one of a number of times of a failed login on an application on the computing device, a presence of a keystroke logger or a screen grabber, an identification of a process injection, geolocation data, an indication that a webcam or a microphone of the computing device are in use, or an indication that a light or a microphone of the webcam have been modified.

In some examples, the agent may be a dissolvable agent. The agent of the computing device may use in-line hooking or deep-hooking to generate processes to perform actions on the computing device. The local DNS of the agent may include the private domain name associated with a role of a user of the computing device in an organization hierarchy. In some examples, the method may include replacing the role of the user of the computing device with a new role in the organization hierarchy, removing the local DNS from the agent of the computing device, and pushing a new local DNS to the agent based on the new role of the user of the computing device, wherein the new local DNS comprises a different private domain name than the local DNS.

In one example, a system for managing a need-to-know domain name system may include at least one physical processor and physical memory that includes computer-executable instructions that, when executed by the physical processor, cause the physical processor to (i) intercept, by an agent of a computing device, network traffic received on the computing device, (ii) generate, by the agent, a one-time password based on a unique identifier of the agent of the computing device, (iii) wrap, by the agent, the network traffic with the one-time password, and (iv) push, by the agent, the wrapped network traffic to a cloud server using a local domain name system (DNS) of the agent of the computing device, wherein the local DNS comprises a private domain name unpublished in a global DNS.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept, by an agent of a computing device, network traffic received on the computing device, (ii) generate, by the agent, a one-time password based on a unique identifier of the agent of the computing device, (iii) wrap, by the agent, the network traffic with the one-time password, and (iv) push, by the agent, the wrapped network traffic to a cloud server using a local domain name system (DNS) of the agent of the computing device, wherein the local DNS comprises a private domain name unpublished in a global DNS.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
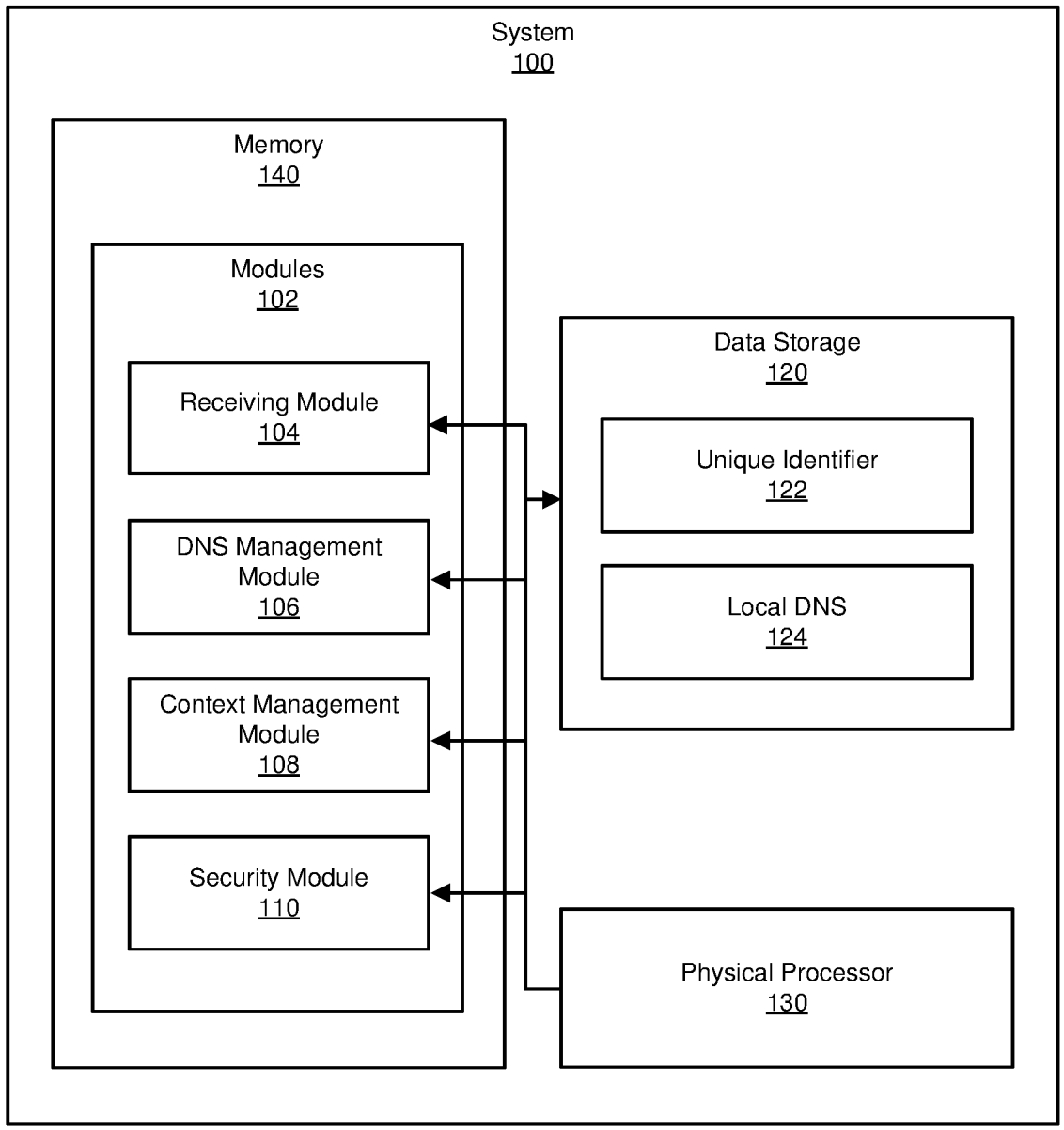
FIG. 1 is a block diagram of an example system for managing a need-to-know domain name system.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for managing a need-to-know domain name system. As will be described in greater detail below, a need-to-know domain name system (DNS) may be utilized to limit access to protected computing resources. The system may identify secured endpoints and may push a local DNS generated from a need-to-know DNS to the endpoint. The local DNS may contain access information for protected computing resources that is based on the identity of the endpoint and/or a user of the endpoint. The endpoint may communicate with the cloud server using the information from the local DNS. However, if the system detects that the security of the endpoint has been compromised, based, for example, on security context data, the system may terminate access to the cloud server and may block access to that resource from the compromised endpoint device.

For example, John at XYZ company may be an advisor working on a project using his laptop. Based on his role as an advisor, John may download and install an agent on his laptop, which contains a local DNS generated based on the advisor role in the XYZ company. John may access projects on a cloud server using information obtained from the local DNS, as the domain for the cloud server is not published in a global DNS, and thus cannot be accessed unless explicitly identified through the local DNS. Furthering the example, Sally may be a manager at the XYZ company. Based on her role as a manager, Sally may download and install an agent onto her laptop, which contains a local DNS specific to her role as a manager. Sally may access a different cloud server using her local DNS. The cloud server accessed by Sally may not be visible to John (e.g., not listed in John's local DNS) because his role does not permit him access to such resources and thus, John does not need to know of the existence of such a resource. By utilizing a need-to-know DNS, the systems described herein may obviate the need to list domains in a global DNS, thereby removing opportunities for attackers to gather information to exploit vulnerabilities of those domains that are publicly listed.

Figure 2:
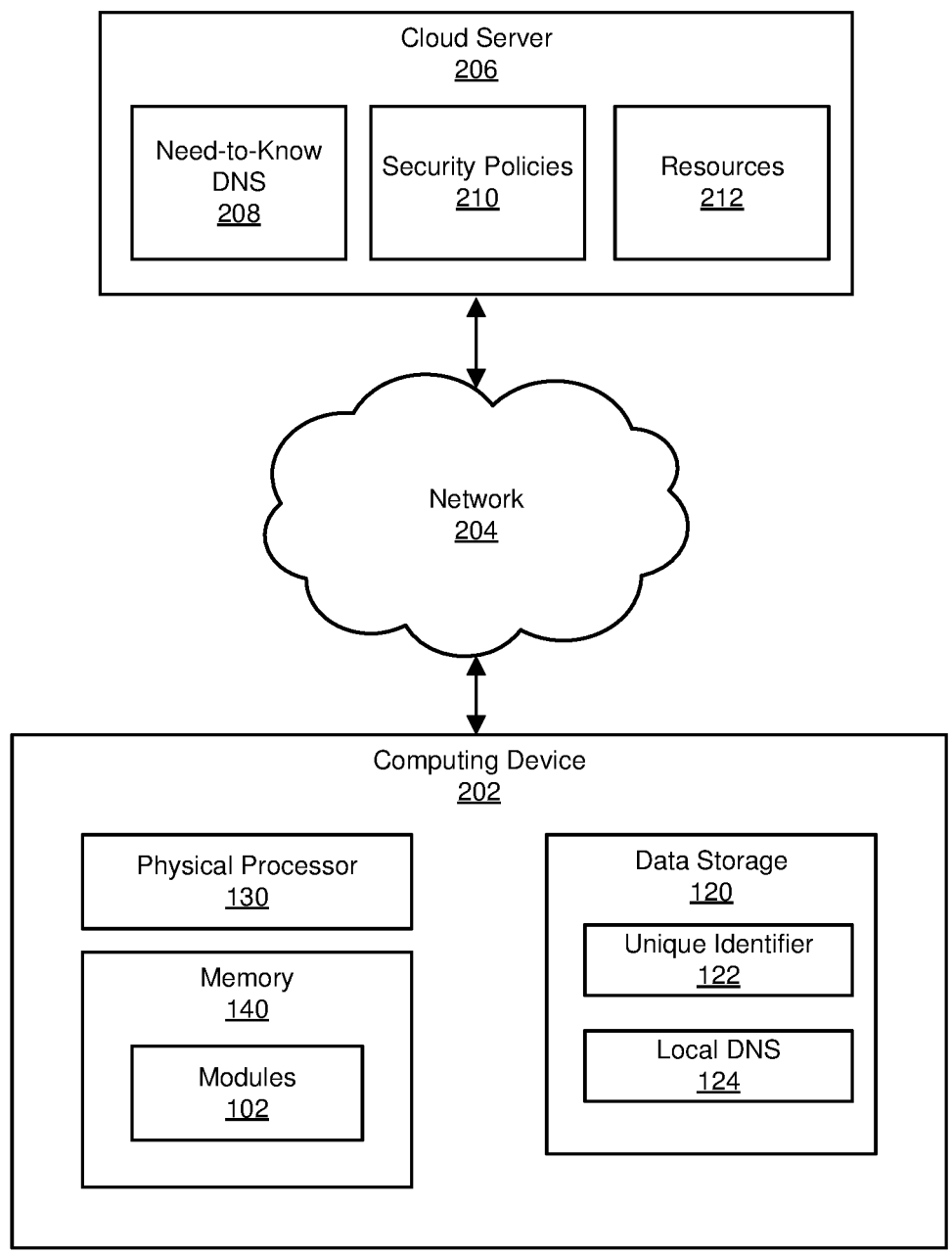
FIG. 2 is a block diagram of an additional example system for managing a need-to-know domain name system.

The following will provide, with reference to FIGS. 1-2, detailed descriptions of example systems for managing a need-to-know domain name system. Detailed descriptions of corresponding computer-implemented methods will also be provided in connection with FIG. 3. A detailed description of data flow through the example system for managing a need-to-know domain name system will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for managing a need-to-know domain name system. As illustrated in this figure, example system 100 may include one or more modules 102 for performing one or more tasks. As will be explained in greater detail below, modules 102 may include a receiving module 104, a DNS management module 106, a context management module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202 and/or cloud server 206). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate managing a need-to-know domain name system. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store a unique identifier 122 and/or a local DNS 124.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with a cloud server 206 via a network 204. In one example, all or a portion of the functionality of the modules 102 may be performed by the computing device 202, the cloud server 206, and/or any other suitable computing system. As will be described in greater detail below, one or more of the modules 102 from FIG. 1 may, when executed by at least one processor of the computing device 202 and/or the cloud server 206, enable the computing device 202 and/or the cloud server 206 to manage a need-to-know domain name system. For example, and as will be described in greater detail below, one or more of the modules 102 may cause the computing device 202 and/or the cloud server 206 to intercept, by an agent of the computing device 202, network traffic received on the computing device 202, generate a one-time password based on a unique identifier of the agent of the computing device 202, wrap the network traffic with the one-time password, and push the wrapped network traffic to the cloud server 206 using a local DNS of the agent of the computing device 202, wherein the local DNS comprises a private domain name unpublished in a global DNS.

The computing device 202 generally represents any type or form of computing device capable of reading computer-executable instructions. For example, the computing device 202 may include an endpoint device (e.g., a mobile computing device) running client-side security software. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The cloud server 206 generally represents any type or form of computing device that is capable of reading computer-executable instructions. Additional examples of the cloud server 206 include, without limitation, security servers, application servers, web servers, storage servers, and/or database servers configured to run certain software applications and/or provide various security, web, storage, and/or database services. Although illustrated as a single entity in FIG. 2, the cloud server 206 may include and/or represent a plurality of servers that work and/or operate in conjunction with one another. The cloud server 206 may manage a need-to-know DNS 208, one or more security policies 210, and/or one or more resources 212.

The network 204 generally represents any medium or architecture capable of facilitating communication or data transfer. In one example, the network 204 may facilitate communication between the computing device 202 and the cloud server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
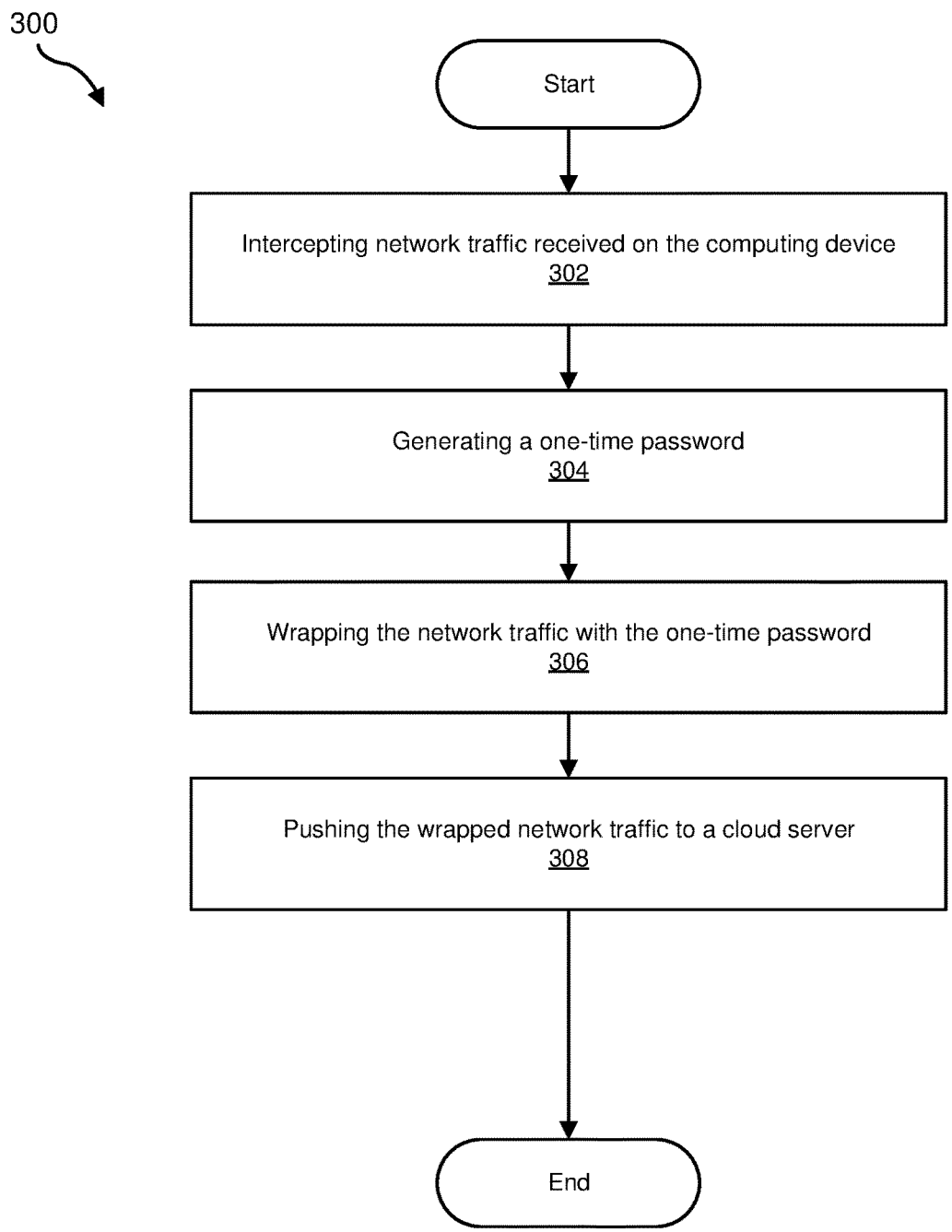
FIG. 3 is a flow diagram of an example method for managing a need-to-know domain name system.
Figure 4:
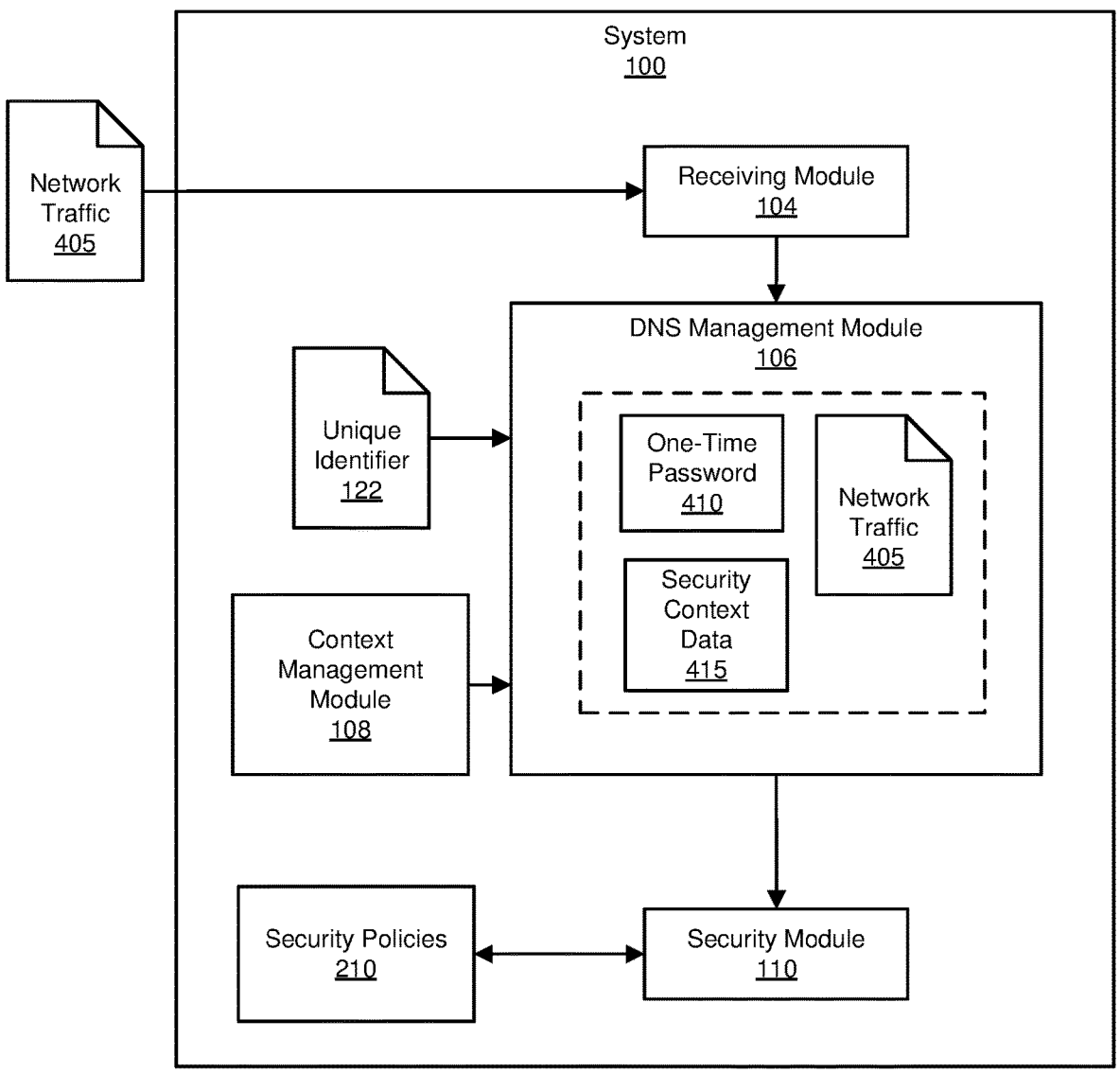
FIG. 4 is a data flow diagram of an example system for managing a need-to-know domain name system.

FIG. 3 is a flow diagram of an example computer-implemented method 300 for managing a need-to-know domain name system. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may intercept network traffic received on a computing device. The system may intercept network traffic in an any suitable manner. For example, the receiving module 104 may, as part of computing device 202 in FIG. 2, intercept network traffic received on the computing device 202. In some examples, an agent of the computing device 202 may intercept the network received on the computing device 202.

The systems described herein may perform step 302 in a variety of ways. In some examples, the agent may include one or more modules, such as the receiving module 104, DNS management module 106, context management module 108, and/or the security module 110. The agent may be explicitly installed on the computing device 202 in response to a request or a command from a user of the computing device 202. In some examples, the agent may be installed automatically on the computing device with a software security application, package, and/or update. In some examples, the agent may be a dissolvable agent. A dissolvable agent may be a software component that is not installed or stored on a computing device but is obtained and executed at run-time and removed from the device upon completion of a specified task and/or process.

In some examples, the agent may include the local DNS 124 specific to the computing device 202 and/or the user of the computing device 202. The agent may store the local DNS 124 in data storage, such as data storage 120 of the computing device 202.

The term "local DNS," as used herein, generally refers to a data structure that lists entries identifying unpublished domain names for one or more cloud servers. The local DNS 124 may be a subset of entries from a need-to-know DNS managed in a cloud environment of a computing system. The local DNS 124 may include entries identified to be associated with a computing device 202 and/or a user of the computing device 202. For example, the local DNS 124 of an agent of a computing device 202 may include one or more private or unpublished domain names associated with a role of a user of the computing device 202 in an organization hierarchy (e.g., manager, supervisor, executive of an organization). The local DNS 124 may be generated in a cloud computing environment and pushed to an endpoint of a computing system with the installation or execution of an agent on the computing device.

The term "need-to-know DNS," as used herein, generally refers to a private or unpublished domain name system managed within an organization or computing environment. The entries in the need-to-know DNS may not be globally published or accessible by users outside of an identified computing system or organization. The need-to-know DNS may include unpublished domain names managed in a cloud environment of a computing system and corresponding access permissions for users in an organization or associated with a computing environment. The local DNS 124 for an identified computing device 202 may be generated from the need-to-know DNS, where the local DNS 124 may include unpublished domain names approved to provide access to a user of the endpoint device upon successful authentication of the computing device 202 on which the local DNS 124 resides.

In some examples, the agent (which may include the receiving module 104, the DNS management module 106, the context management module 108, and/or the security module 110) may generate one or more processes to, for example, complete one or more actions as described herein (e.g., generating a one-time password, wrapping network traffic, etc.). The agent may determine that the endpoint (e.g., computing device 202) is secure and may generate one or more processes to complete an action.

In some examples, the agent may determine that the endpoint may be compromised by an attacker or malicious user. Rather than generating a process that is identifiable as related to the agent, the agent may utilize hooking to hide the presence of the agent on the computing device 202 to protect against malicious users or attackers from knowing that the agent is on the computing device 202. In some examples, the agent may utilize inline hooking, where hooks of the agent may be placed by modifying code at the top of a method or function of the computing device 202. In some examples, the agent may utilize deep-hooking at process creation, where modifications are made within the method or function of the computing device 202, obscuring the process created by the agent and making detection of the process more difficult.

In some examples, a module of the agent, such as the receiving module 104, may intercept incoming network traffic for the computing device 202. The network traffic may be received over different types of connections, such as a virtual private network (VPN), HTTP proxy, and/or browser extension. The network traffic received may be encrypted by the connection on which it is transmitted to the computing device 202. In some examples, the DNS management module 106 of the agent may locally terminate the VPN, HTTP proxy, or browser extension to access the encrypted network traffic.

At step 304, one or more of the systems described herein may generate a one-time password. The system may perform this step in any suitable manner. For example, the DNS management module 106 may, as part of computing device 202 in FIG. 2, generate a one-time password.

The term "one-time password," as used herein, generally refers to a password that is valid for only one login session or transaction on a computer system or computing device. One-time passwords may also be referred to as one-time pins or dynamic passwords. One-time passwords may be generated using any known techniques, which may include, but are not limited to, algorithms based on time-synchronization (e.g., password generation is based on current time), mathematical algorithms that are based on previously created one-time passwords (e.g., one time passwords are effectively a chain and must be used in a predefined order, and/or based on a challenge, such as a random number and/or counter.

In some examples, the DNS management module 106 of the agent may generate a one-time password using a unique identifier, such as unique identifier 122, as a seed or the like. In some examples, the unique identifier may be an identifier unique to the agent downloaded to the computing device 202. The unique identifier may be an identifier generated based on the agent downloaded and/or an identifier of the computing device, such as an identifier associated with a hard drive, processor, and/or memory of the computing device 202. The unique identifier 122 may be stored in the data storage of the computing device 202, such as the data storage 120.

At step 306, one or more of the systems described herein may wrap the network traffic with the one-time password. The system may perform this step in any suitable manner. For example, the DNS management module 106 may use the one-time password generated using the unique identifier 122 to wrap the intercepted network traffic. In some examples, the DNS management module 106 may take the encrypted network traffic received from an external source by the computing device 202. The DNS management module 106 may leave the encryption of the network traffic intact and may wrap, encrypt, embed, or otherwise associate the encrypted network traffic using the one-time password.

In some examples, the context management module 108 may obtain security context data of the computing device.

Examples of security context data may include, but are not limited to, a number of times of a failed login on an application on the computing device, the presence of a keystroke logger or a screen grabber, an identification of a process injection on the computing device 202, geolocation data, an indication that a webcam or a microphone of the computing device are in use, an indication that a light or a microphone of the webcam have been modified, or the like. In some examples, the context management module 108 may collect the data directly from the computing device 202. In some examples, the context management module 108 may obtain the security context data from one or more security applications executing on the computing device 202.

The context management module 108 may transmit the security context data to the DNS management module 106. The DNS management module may wrap the network traffic and the security context data using the one-time password. In some examples, the DNS management module 106 may wrap the network traffic using the one-time password and may transmit the wrapped network traffic with the security context data. In some examples, the DNS management module 106 may separately encrypt the security context data and may associate the encrypted security context data and the wrapped network traffic.

At step 308, one or more of the systems described herein may push the wrapped network traffic to a cloud server. The system may perform this step in any suitable manner. For example, the DNS management module 106 may, as part of computing device 202 in FIG. 2, push the wrapped network traffic to a cloud server, such as the cloud server 206 using the local DNS 124 associated with the agent. In some examples, the wrapped network traffic may be transmitted to the cloud server 206 over a secure connection. The DNS management module 106 of the agent may obtain information from the local DNS 124 to establish a connection with the cloud server 206. The DNS management module 106 may use the information from the local DNS 124 to establish a secure connection with the cloud server 206 and to transmit the wrapped network traffic to the cloud server 206.

In some examples, the role associated with the user of the computing device 202 may change, necessitating an update in the local DNS 124 to reflect the change. In some examples, the DNS management module 106 may receive an indication that the role associated with the user of the computing device 202 has changed. The DNS management module 106 may remove the local DNS 124 from the computing device 202. An updated local DNS may be generated from the need-to-know DNS in the cloud computing environment to remove the previously stored DNS entries and to include DNS entries associated with the new role of the user in the hierarchy of the organization. The updated local DNS 124 may be pushed down to the computing device 202. The DNS management module 106 of the agent on the computing device 202 may store the updated local DNS 124 in the data storage 120 of the computing device.

In some examples, one or more of the systems described herein may perform a security action. The system may perform this step in any suitable manner. The security module 110 may, as part of computing device 202 in FIG. 2, perform a security action. In some examples, the security action may include terminating access to the cloud server or modifying the local DNS of the agent of the computing device. In some examples, the security module 110 may determine that the security of an endpoint device, such as the computing device 202, has been compromised and may terminate and block any further connections with the endpoint device. For example, the security module 110 may determine that the one-time password used to wrap the network traffic does not correspond to the computing device 202 or is otherwise not a match. The security module 110 may extract the security context data from the wrapped network traffic and may determine that the security of the endpoint has been compromised. For example, the security module 110 may compare the security context data with one or more security policies and/or may determine that the security context data has exceeded one or more predetermined security thresholds (e.g., number of failed logins exceeded a predetermined number, detection of a keystroke logger on the computing device 202, and the like).

In response to determining that the security of the computing device 202 has been compromised, the security module 110 may terminate any access to the cloud server 206 from the endpoint device. Additionally, the security module 110 may update the need-to-know DNS to update permissions associated with the endpoint and/or user and may update the local DNS for that computing device 202 and push the local DNS to the endpoint device. The updated local DNS may remove any information needed to access the cloud servers 206 and/or may redirect the user to public domains and/or resources.

The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of the computing device 202, enable the system 400 to manage a need-to-know domain name system. For example, and as will be described in greater detail herein, one or more of the modules 102 may cause the example system 400 to receive, by the receiving module 104, network traffic 405. The DNS management module 106 may generate a one-time password 410 based on a unique identifier 122 of the computing device 202. The DNS management module 106 may receive security context data 415 obtained by the context management module 108. The DNS management module 106 may wrap the network traffic 405 using the one-time password 410. In some examples, the security context data 415 may be encrypted. The DNS management module 106 may transmit the network traffic 405 wrapped in the one-time password 410 and the security context data 415 to the security module 110. The security module 110 may process the received network traffic 405 and/or security context data 415 and may perform a security action. In some examples, the security action may be based on one or more security policies 210 of the system 100.

The systems and methods described herein are directed to managing a need-to-know domain name system. Global domain name systems often publish details about ownership of and information about the resource, which malicious users may use to attack and infiltrate publicly listed domains. A need-to-know domain name system (DNS) may be utilized to limit access to protected computing resources. Secured endpoints may be identified and local DNS may be pushed to the endpoint. The local DNS may contain limited access information for protected computing resources based on the identity of the endpoint and/or user of the endpoint. The endpoint may communicate with the cloud server using the information from the local DNS. The systems and methods described herein may eliminate the need to list certain domains in a global DNS and may remove opportunities for attackers to gather information to exploit vulnerabilities of publicly listed domains.

Figure 5:
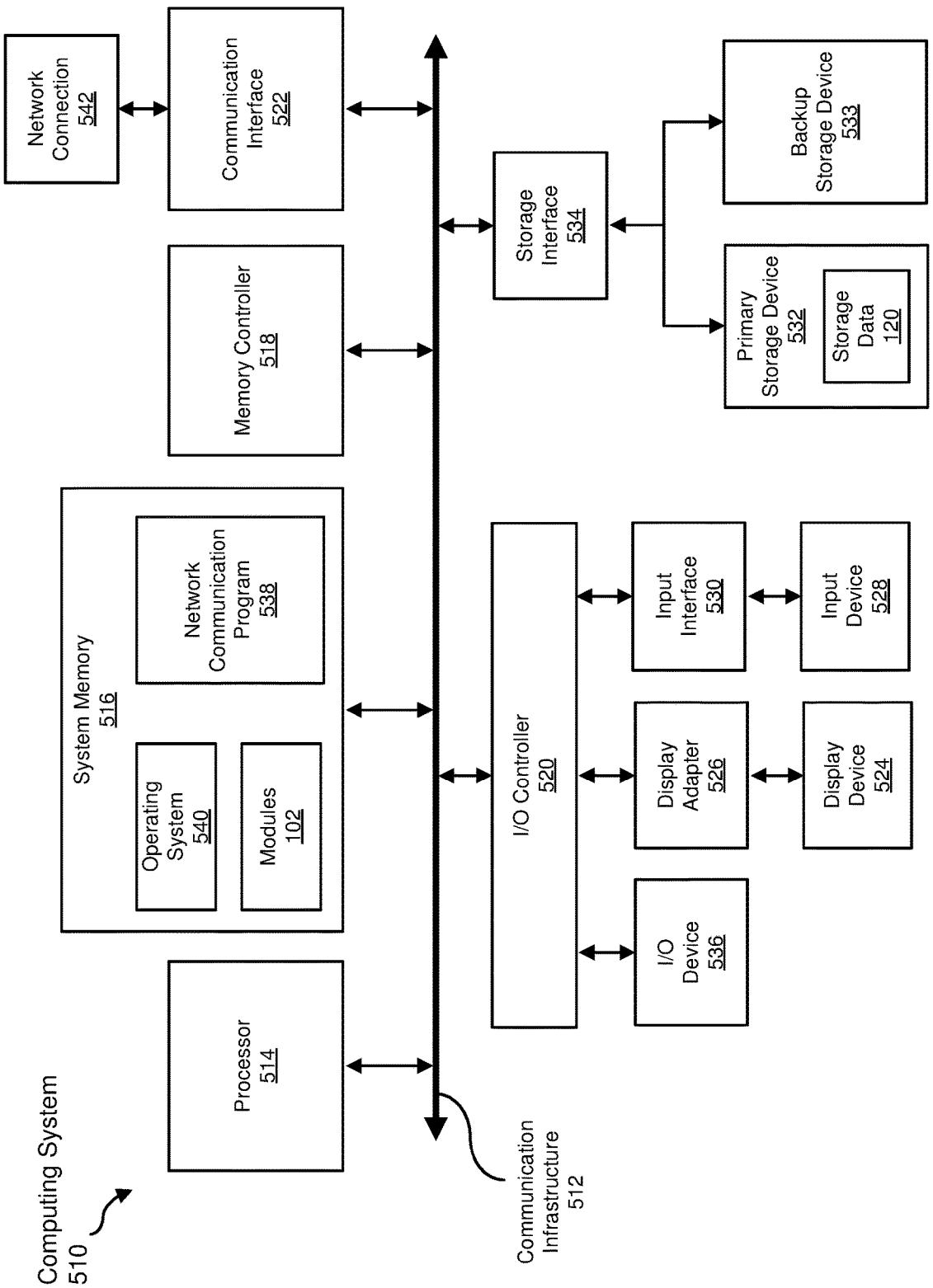
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of the computing system 510 may perform and/or be a means for performing, either alone or in combination with other elements, one or more of the steps described herein (such as one or more of the steps illustrated in FIG. 3). All or a portion of the computing system 510 may also perform and/or be a means for performing any other steps, methods, or processes described and/or illustrated herein.

The computing system 510 broadly represents any single or multi-processor computing device or system capable of executing computer-readable instructions. Examples of the computing system 510 include, without limitation, workstations, laptops, client-side terminals, servers, distributed computing systems, handheld devices, or any other computing system or device. In its most basic configuration, the computing system 510 may include at least one processor 514 and a system memory 516.

The processor 514 generally represents any type or form of physical processing unit (e.g., a hardware-implemented central processing unit) capable of processing data or interpreting and executing instructions. In certain embodiments, the processor 514 may receive instructions from a software application or module. These instructions may cause the processor 514 to perform the functions of one or more of the example embodiments described and/or illustrated herein.

The system memory 516 generally represents any type or form of volatile or non-volatile storage device or medium capable of storing data and/or other computer-readable instructions. Examples of the system memory 516 include, without limitation, Random Access Memory (RAM), Read Only Memory (ROM), flash memory, or any other suitable memory device. Although not required, in certain embodiments the computing system 510 may include both a volatile memory unit (such as, for example, the system memory 516) and a non-volatile storage device (such as, for example, the primary storage device 532, as described in detail below). In one example, one or more of the modules 102 from FIG. 1 may be loaded into the system memory 516.

In some examples, the system memory 516 may store and/or load an operating system 540 for execution by the processor 514. In one example, the operating system 540 may include and/or represent software that manages computer hardware and software resources and/or provides common services to computer programs and/or applications on the computing system 510. Examples of the operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 510 may also include one or more components or elements in addition to the processor 514 and the system memory 516. For example, as illustrated in FIG. 5, the computing system 510 may include a memory controller 518, an Input/Output (I/O) controller 520, and a communication interface 522, each of which may be interconnected via a communication infrastructure 512. The communication infrastructure 512 generally represents any type or form of infrastructure capable of facilitating communication between one or more components of a computing device. Examples of the communication infrastructure 512 include, without limitation, a communication bus (such as an Industry Standard Architecture (ISA), Peripheral Component Interconnect (PCI), PCI Express (PCIe), or similar bus) and a network.

The memory controller 518 generally represents any type or form of device capable of handling memory or data or controlling communication between one or more components of the computing system 510. For example, in certain embodiments, the memory controller 518 may control communication between the processor 514, the system memory 516, and the I/O controller 520 via the communication infrastructure 512.

The I/O controller 520 generally represents any type or form of module capable of coordinating and/or controlling the input and output functions of a computing device. For example, in certain embodiments, the I/O controller 520 may control or facilitate transfer of data between one or more elements of the computing system 510, such as the processor 514, the system memory 516, the communication interface 522, the display adapter 526, the input interface 530, and the storage interface 534.

As illustrated in FIG. 5, the computing system 510 may also include at least one display device 524 coupled to the I/O controller 520 via a display adapter 526. The display device 524 generally represents any type or form of device capable of visually displaying information forwarded by the display adapter 526. Similarly, the display adapter 526 generally represents any type or form of device configured to forward graphics, text, and other data from the communication infrastructure 512 (or from a frame buffer, as known in the art) for display on the display device 524.

As illustrated in FIG. 5, the example computing system 510 may also include at least one input device 528 coupled to the I/O controller 520 via an input interface 530. The input device 528 generally represents any type or form of input device capable of providing input, either computer or human generated, to the example computing system 510. Examples of the input device 528 include, without limitation, a keyboard, a pointing device, a speech recognition device, variations or combinations of one or more of the same, and/or any other input device.

Additionally, or alternatively, the example computing system 510 may include additional I/O devices. For example, the example computing system 510 may include the I/O device 536. In this example, the I/O device 536 may include and/or represent a user interface that facilitates human interaction with the computing system 510. Examples of the I/O device 536 include, without limitation, a computer mouse, a keyboard, a monitor, a printer, a modem, a camera, a scanner, a microphone, a touchscreen device, variations or combinations of one or more of the same, and/or any other I/O device.

The communication interface 522 broadly represents any type or form of communication device or adapter capable of facilitating communication between the example computing system 510 and one or more additional devices. For example, in certain embodiments, the communication interface 522 may facilitate communication between the computing system 510 and a private or public network including additional computing systems. Examples of the communication interface 522 include, without limitation, a wired network interface (such as a network interface card), a wireless network interface (such as a wireless network interface card), a modem, and any other suitable interface. In at least one embodiment, the communication interface 522 may provide a direct connection to a remote server via a direct link to a network, such as the Internet. The communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 522 may also represent a host adapter configured to facilitate communication between the computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 522 may also allow the computing system 510 to engage in distributed or remote computing. For example, the communication interface 522 may receive instructions from a remote device or send instructions to a remote device for execution.

In some examples, the system memory 516 may store and/or load a network communication program 538 for execution by the processor 514. In one example, the network communication program 538 may include and/or represent software that enables the computing system 510 to establish a network connection 542 with another computing system (not illustrated in FIG. 5) and/or communicate with the other computing system by way of the communication interface 522. In this example, the network communication program 538 may direct the flow of outgoing traffic that is sent to the other computing system via the network connection 542. Additionally, or alternatively, the network communication program 538 may direct the processing of incoming traffic that is received from the other computing system via the network connection 542 in connection with the processor 514.

Although not illustrated in this way in FIG. 5, the network communication program 538 may alternatively be stored and/or loaded in the communication interface 522. For example, the network communication program 538 may include and/or represent at least a portion of software and/or firmware that is executed by a processor and/or Application Specific Integrated Circuit (ASIC) incorporated in the communication interface 522.

As illustrated in FIG. 5, the example computing system 510 may also include a primary storage device 532 and a backup storage device 533 coupled to the communication infrastructure 512 via a storage interface 534. The storage devices 532 and 533 generally represent any type or form of storage device or medium capable of storing data and/or other computer-readable instructions. For example, the storage devices 532 and 533 may be a magnetic disk drive (e.g., a so-called hard drive), a solid state drive, a floppy disk drive, a magnetic tape drive, an optical disk drive, a flash drive, or the like. The storage interface 534 generally represents any type or form of interface or device for transferring data between the storage devices 532 and 533 and other components of the computing system 510. In one example, the data storage 120 from FIG. 1 may be stored and/or loaded in the primary storage device 532.

In certain embodiments, the storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 532 and 533 may also include other similar structures or devices for allowing computer software, data, or other computer-readable instructions to be loaded into the computing system 510. For example, the storage devices 532 and 533 may be configured to read and write software, data, or other computer-readable information. The storage devices 532 and 533 may also be a part of the computing system 510 or may be a separate device accessed through other interface systems.

Many other devices or subsystems may be connected to the computing system 510. Conversely, all of the components and devices illustrated in FIG. 5 need not be present to practice the embodiments described and/or illustrated herein. The devices and subsystems referenced above may also be interconnected in different ways from that shown in FIG. 5. The computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 510. All or a portion of the computer program stored on the computer-readable medium may then be stored in the system memory 516 and/or various portions of the storage devices 532 and 533. When executed by the processor 514, a computer program loaded into the computing system 510 may cause the processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 510 may be configured as an Application Specific Integrated Circuit (ASIC) adapted to implement one or more of the example embodiments disclosed herein.

Figure 6:
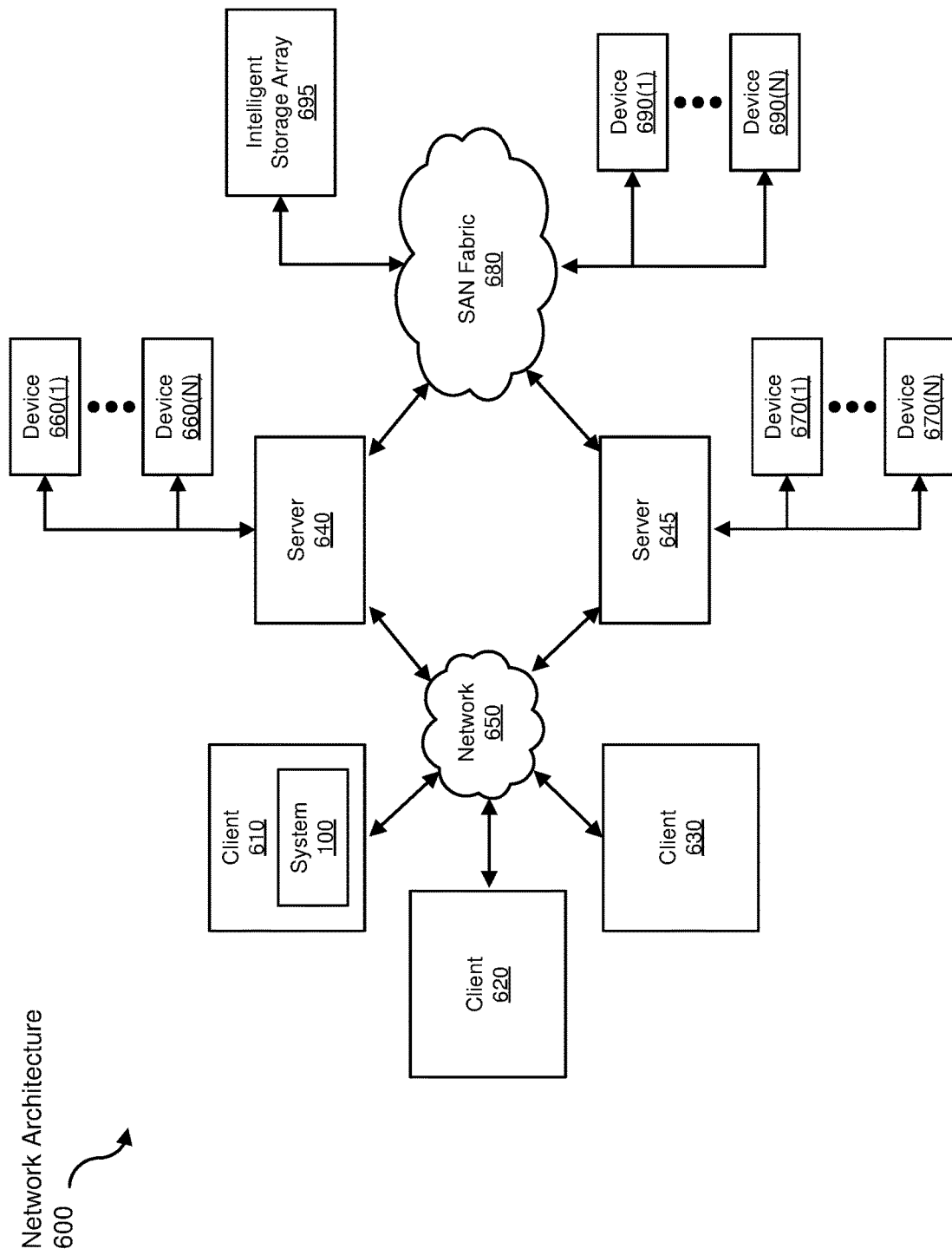
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of the network architecture 600 may perform and/or be a means for performing, either alone or in combination with other elements, one or more of the steps disclosed herein (such as one or more of the steps illustrated in FIG. 3). All or a portion of the network architecture 600 may also be used to perform and/or be a means for performing other steps and features set forth in the present disclosure.

The client systems 610, 620, and 630 generally represent any type or form of computing device or system, such as the example computing system 510 in FIG. 5. Similarly, the servers 640 and 645 generally represent computing devices or systems, such as application servers or database servers, configured to provide various database services and/or run certain software applications. The network 650 generally represents any telecommunication or computer network including, for example, an intranet, a WAN, a LAN, a PAN, or the Internet. In one example, the client systems 610, 620, and/or 630 and/or servers 640 and/or 645 may include all or a portion of the system 100 from FIG. 1.

As illustrated in FIG. 6, one or more storage devices 660(1)-(N) may be directly attached to the server 640. Similarly, the one or more storage devices 670(1)-(N) may be directly attached to the server 645. The storage devices 660(1)-(N) and the storage devices 670(1)-(N) generally represent any type or form of storage device or medium capable of storing data and/or other computer-readable instructions. In certain embodiments, the storage devices 660(1)-(N) and the storage devices 670(1)-(N) may represent Network-Attached Storage (NAS) devices configured to communicate with the servers 640 and 645 using various protocols, such as Network File System (NFS), Server Message Block (SMB), or Common Internet File System (CIFS).

The servers 640 and 645 may also be connected to a Storage Area Network (SAN) fabric 680. The SAN fabric 680 generally represents any type or form of computer network or architecture capable of facilitating communication between a plurality of storage devices. The SAN fabric 680 may facilitate communication between the servers 640 and 645 and a plurality of the storage devices 690(1)-(N) and/or an intelligent storage array 695. The SAN fabric 680 may also facilitate, via the network 650 and the servers 640 and 645, communication between the client systems 610, 620, and 630 and the storage devices 690(1)-(N) and/or the intelligent storage array 695 in such a manner that the devices 690(1)-(N) and the array 695 appear as locally attached devices to the client systems 610, 620, and 630. As with the storage devices 660(1)-(N) and the storage devices 670(1)-(N), the storage devices 690(1)-(N) and the intelligent storage array 695 generally represent any type or form of storage device or medium capable of storing data and/or other computer-readable instructions.

In certain embodiments, and with reference to the example computing system 510 of FIG. 5, a communication interface, such as the communication interface 522 in FIG. 5, may be used to provide connectivity between each client system 610, 620, and 630 and the network 650. The client systems 610, 620, and 630 may be able to access information on the server 640 or 645 using, for example, a web browser or other client software. Such software may allow the client systems 610, 620, and 630 to access data hosted by the server 640, the server 645, the storage devices 660(1)-(N), the storage devices 670(1)-(N), the storage devices 690(1)-(N), or the intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 640, the server 645, the storage devices 660(1)-(N), the storage devices 670(1)-(N), the storage devices 690(1)-(N), the intelligent storage array 695, or any combination thereof. All or a portion of one or more of the example embodiments disclosed herein may also be encoded as a computer program, stored in the server 640, run by the server 645, and distributed to the client systems 610, 620, and 630 over the network 650.

As detailed above, the computing system 510 and/or one or more components of the network architecture 600 may perform and/or be a means for performing, either alone or in combination with other elements, one or more steps of an example method for managing a need-to-know domain name system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, the mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing a need-to-know domain name system, at least a portion of the method being performed by a computing device comprising at least one processor, the method comprising:
   intercepting, by an agent of the computing device, network traffic received on the computing device;
   generating, by the agent of the computing device, a one-time password based on a unique identifier of the agent of the computing device;
   wrapping, by the agent of the computing device, the network traffic with the one-time password; and
   pushing, by the agent of the computing device, the wrapped network traffic to a cloud server using a local domain name system (DNS) of the agent of the computing device, wherein the local DNS of the agent comprises a private domain name unpublished in a global DNS.

2. The computer-implemented method of claim 1, further comprising:
   performing a security action, wherein the security action comprises at least one of:
      terminating access to the cloud server; or
      modifying the local DNS of the agent of the computing device.

3. The computer-implemented method of claim 2, further comprising:
   obtaining, by the agent of the computing device, security context data of the computing device;
   encrypting the security context data;
   transmitting the security context data with the wrapped network traffic; and
   performing the security action based on the security context data.

4. The computer-implemented method of claim 3, wherein the security context data comprises at least one of:
   a number of times of a failed login on an application on the computing device;
   a presence of a keystroke logger or a screen grabber;
   an identification of a process injection;
   geolocation data;
   an indication that a webcam or a microphone of the computing device are in use; or
   a second indication that a light or the microphone of the webcam have been modified.

5. The computer-implemented method of claim 1, wherein the agent of the computing device is a dissolvable agent.

6. The computer-implemented method of claim 1, wherein the agent of the computing device uses in-line hooking or deep-hooking to generate processes to perform actions on the computing device.

7. The computer-implemented method of claim 1, wherein the local DNS of the agent of the computing device comprises the private domain name associated with a role of a user of the computing device in an organization hierarchy.

8. The computer-implemented method of claim 7, further comprising:
   replacing the role of the user of the computing device with a new role in the organization hierarchy;
   removing the local DNS of the agent from the agent of the computing device; and
   pushing a new local DNS to the agent of the computing device based on the new role of the user of the computing device, wherein the new local DNS comprises a different private domain name than the local DNS of the agent.

9. A system for managing a need-to-know domain name system, the system comprising:
   at least one physical processor;
   physical memory comprising computer-executable instructions that, when executed by the at least one physical processor, cause the at least one physical processor to:
      intercept, by an agent of a computing device, network traffic received on the computing device;
      generate, by the agent of the computing device, a one-time password based on a unique identifier of the agent of the computing device;
      wrap, by the agent of the computing device, the network traffic with the one-time password; and
      push, by the agent of the computing device, the wrapped network traffic to a cloud server using a local domain name system (DNS) of the agent of the computing device, wherein the local DNS of the agent comprises a private domain name unpublished in a global DNS.

10. The system of claim 9, wherein the computer-executable instructions further cause the at least one physical processor to:
   perform a security action, wherein the security action comprises at least one of:
      terminating access to the cloud server; or
      modifying the local DNS of the agent of the computing device.

11. The system of claim 10, wherein the computer-executable instructions further cause the at least one physical processor to:
   obtain security context data of the computing device;
   encrypt the security context data;
   transmit the security context data with the wrapped network traffic; and
   perform the security action based on the security context data.

12. The system of claim 11, wherein the security context data comprises at least one of:
   a number of times of a failed login on an application on the computing device;
   a presence of a keystroke logger or a screen grabber;
   an identification of a process injection;
   geolocation data;
   an indication that a webcam or a microphone of the computing device are in use; or
   a second indication that a light or the microphone of the webcam have been modified.

13. The system of claim 9, wherein the agent of the computing device is a dissolvable agent.

14. The system of claim 9, wherein the agent of the computing device uses in-line hooking or deep-hooking to generate processes to perform actions on the computing device.

15. The system of claim 9, wherein the local DNS of the agent of the computing device comprises the private domain name associated with a role of a user of the computing device in an organization hierarchy.

16. The system of claim 15, wherein the computer-executable instructions further cause the at least one physical processor to:
   replace the role of the user of the computing device with a new role in the organization hierarchy;
   remove the local DNS of the agent from the agent of the computing device; and
   push a new local DNS to the agent of the computing device based on the new role of the user of the computing device, wherein the new local DNS comprises a different private domain name than the local DNS of the agent.

17. A non-transitory computer-readable medium comprising one or more computer-executable instructions that, when executed by at least one processor of a computing device, cause the computing device to:
   intercept, by an agent of the computing device, network traffic received on the computing device;
   generate, by the agent of the computing device, a one-time password based on a unique identifier of the agent of the computing device;
   wrap, by the agent of the computing device, the network traffic with the one-time password; and
   push, by the agent of the computing device, the wrapped network traffic to a cloud server using a local domain name system (DNS) of the agent of the computing device, wherein the local DNS of the agent comprises a private domain name unpublished in a global DNS.

18. The non-transitory computer-readable medium of claim 17, wherein the one or more computer-executable instructions further cause the computing device to:
   perform a security action, wherein the security action comprises at least one of:
      terminating access to the cloud server; or
      modifying the local DNS of the agent of the computing device.

19. The non-transitory computer-readable medium of claim 18, wherein the one or more computer-executable instructions further cause the computing device to:
   obtain security context data of the computing device;
   encrypt the security context data;
   transmit the security context data with the wrapped network traffic; and
   perform the security action based on the security context data.

20. The non-transitory computer-readable medium of claim 19, wherein the security context data comprises at least one of:
   a number of times of a failed login on an application on the computing device;
   a presence of a keystroke logger or a screen grabber;
   an identification of a process injection;
   geolocation data;
   an indication that a webcam or a microphone of the computing device are in use; or
   a second indication that a light or the microphone of the webcam have been modified.

* * * * *